United States Patent [19]

Ward

[11] 3,867,277
[45] Feb. 18, 1975

[54] LOW PRESSURE HYDROCRACKING PROCESS

[75] Inventor: John W. Ward, Yorba Linda, Calif.
[73] Assignee: Union Oil Company of California, Los Angeles, Calif.
[22] Filed: May 23, 1973
[21] Appl. No.: 363,246

[52] U.S. Cl. .............................................. 208/111
[51] Int. Cl. ............................................. C10g 13/02
[58] Field of Search ...................................... 208/111

[56] References Cited
UNITED STATES PATENTS

| | | | |
|---|---|---|---|
| 3,293,192 | 12/1966 | Maher et al. | 252/430 |
| 3,354,076 | 11/1967 | Beuther et al. | 208/111 |
| 3,354,077 | 11/1967 | Hansford | 208/111 |
| 3,507,812 | 4/1970 | Smith et al. | 252/455 |
| 3,595,611 | 7/1971 | McDaniel et al. | 252/455 |
| 3,781,199 | 12/1973 | Ward | 208/89 |

Primary Examiner—Delbert E. Gantz
Assistant Examiner—S. Berger
Attorney, Agent, or Firm—Lannas S. Henderson; Richard C. Hartman; Dean Sandford

[57] ABSTRACT

Catalytic hydrocracking is carried out at low pressures, below 1,000 psi, and at relatively high space velocities and conversions per pass, utilizing a special class of catalysts which are found to be especially resistant to deactivation under such conditions. These catalysts comprise a Group VIII metal hydrogenating component supported upon a low-sodium hydrogen Y zeolite cracking base which has been subjected to thermal stabilization.

17 Claims, 1 Drawing Figure

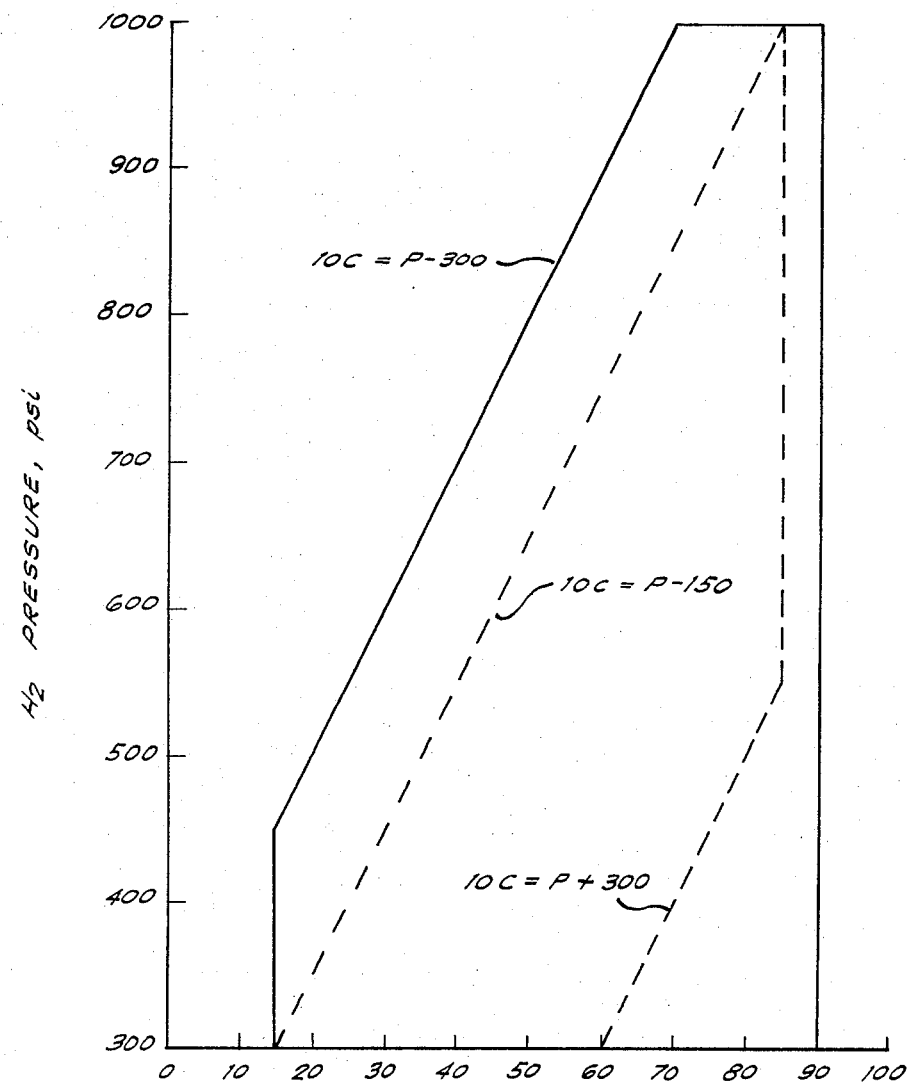

LOW PRESSURE HYDROCRACKING PROCESS

BACKGROUND AND SUMMARY OF INVENTION

In catalytic hydrocracking one of the most important economic factors contributing to the cost of the process resides in the need for maintaining a relatively high hydrogen pressure. At hydrocracking temperatures, coke and other carbonaceous material tends to deposit upon and progressively deactivate the catalyst. If however there is a sufficient partial pressure of hydrogen, this coking and deactivation can be brought essentially to an equilibrium level at which sufficient effective hydrocracking activity remains available to give the desired conversion at a relatively constant temperature for long periods of time. The hydrogen pressure required to achieve this equilibrium state varies with the nature of the catalyst.

Conventional hydrocracking catalysts based on amorphous cogel cracking bases such as silica-alumina sometimes require hydrogen pressures as high as 3,000–5,000 psi before an equilibrium activity state is reached. With the advent of the newer hydrocracking catalysts based on crystalline zeolite cracking bases, it was found possible to reach equilibrium activity levels at considerably lower pressures, in the range of about 1,200–2,000 psi. However, even these pressures are very expensive in terms of the required heavy-walled reactors, heat exchangers, pressure vessels, etc, as well as the compressor capacity required. The hydrocracking process would become considerably more economical, both from capital investment and operating standpoints, if it could be operated successfully at pressures in the 300–1,000 psig range, this being the primary objective of the present invention.

I have now discovered that hydrocracking catalysts based on a special class of thermally stabilized hydrogen Y zeolites are much more active and stable at low hydrogen pressures than are catalysts containing the same amount and type of hydrogenating component, but based on Y zeolites which have been stabilized by the introduction of polyvalent metal zeolitic cations into their structure. These thermally stabilized hydrogen Y zeolites are essentially Y zeolites which have been ion-exchanged with ammonium salts to very low sodium levels, below about one weight-percent $Na_2O$, and at one or more stages in their production have been stabilized against hydrothermal degradation by calcining at temperatures between about 900° and 1,600°F, preferably in the presence of steam.

As a result of their higher activity and stability at low hydrogen pressures, the catalysts of this invention can be successfully utilized at hydrogen pressures between about 300 and 1,000 psi, at essentially stable equilibrium temperatures to achieve higher conversions per pass at higher space velocities than can be achieved with analogous catalysts based on polyvalent metal-stabilized Y zeolites. This came as somewhat of a surprise inasmuch as catalyst deactivation rates at a given hydrogen partial pressure are normally considered to be mainly a function of the activity of the hydrogenating component. However, in the present case, even when the respective hydrogenating components are as nearly the same as can be detected, the described differential activities are observed. But at conventional pressures in the range of about 1,200–2,000 psi., the respective differential activities are more nearly the same, which also is surprising.

In the patent literature many hydrocracking process disclosures can be found in which broad pressure ranges of, for example, 300–4,000 psig are recited. It is therefore obvious that it is a physical possibility to operate at low pressures with essentially any type of hydrocracking catalyst. However, the present invention is based on my further discovery that the present catalysts can be utilized at the prescribed low pressures, while at the same time operating at economically feasible high space velocities, and at temperatures sufficiently high to give economically feasible conversions per pass. These objectives are achieved while at the same time maintaining a sufficiently low catalyst deactivation rate to give economical run lengths of at least about two months, and normally greater than six months. Insofar as I am aware, there are no prior art disclosures particularly pointing out means for achieving all these objectives.

U.S. Pat. No. 3,692,666 to Pollitzer discloses a low-pressure hydrocracking process utilizing a catalyst comprising a halided cracking base. However there is no indication as to catalyst deactivation rates or run lengths, and it is notorious that halided cracking bases are rapidly deactivated if traces of water or ammonia are present. The catalysts described herein contain no halide component, and this is a distinct advantage in itself, considering the troublesome precautions which such catalysts require, including expensive metallurgy to resist corrosion, facilities for removing water-generating oxygen compounds from the feed, drying facilities for feed and recycle gas, etc.

The attached drawing is a graph depicting the operative combinations of hydrogen partial pressure and conversions per pass to 400°F end-point gasoline contemplated herein. The broad operative range of combinations is represented by the area bounded by the following lines on the graph.

| | | |
|---|---|---|
| P | = | 300 |
| P | = | 1000 |
| C | = | 15 |
| C | = | 90 |
| 10C | = | P−300 |

The preferred operative range of combinations is represented by the area bounded by the following lines on the graph;

| | | |
|---|---|---|
| P | = | 300 |
| C | = | 85 |
| 10C | = | P−150 |
| 10C | = | P+300 |

The pressure-conversion combinations falling below the line $10C = P+300$ are not preferred herein because they tend, especially with high end-point feeds or feeds containing sulfur and/or nitrogen compounds, to give undesirably high coke and light gas yields. The preferred pressure-conversion combinations generally give good yields of desired liquid products with a minimum of coke and light gases, while still operating at economical conversion levels.

DETAILED DESCRIPTION

A. Description of Catalysts

Effective catalysts for use herein comprise in general any crystalline, hydrothermally stabilized, low-sodium, metal-cation-deficient Y zeolite cracking base upon which is deposited a minor proportion of a Group VIII metal hydrogenating component. The term "metal-cation-deficient" refers to hydrogen and/or decationized Y zeolites in which less than 25 percent, preferably less than about 10 percent of the original sodium zeolite ion-exchange capacity is satisfied by metal cations. The term "hydrothermally stabilized" means a metal-cation-deficient Y zeolite which has been thermally or hydrothermally pretreated to achieve structural stability against the effects of steam at high temperatures. Quantitatively, "structural stability" is defined herein as meaning the ability to retain at least about 50 percent of original crystallinity and surface area after exposure to one atmosphere of steam at 1,000°F for two hours. Another critical characteristic of the Y zeolites utilized herein is their low sodium content, which must be less than 3 percent, and preferably less than 1 percent by weight, as $Na_2O$.

Conventional unstabilized metal-cation-deficient Y zeolites are normally produced by ion exchanging the original sodium zeolite with ammonium salt solutions until the sodium content has been reduced to below about 3 weight-percent, usually below 2 percent, as $Na_2O$. The resulting ammonium zeolite is then calcined under substantially dry conditions at temperatures of about 600°–1,200°F, usually about 800°–1,100°F, to decompose zeolitic ammonium ions and produce the desired hydrogen and/or decationized zeolite. When intimately composited with a hydrogenating metal such as palladium, this material forms a highly active hydrocracking catalyst, but is not hydrothermally stable. To achieve the desired hydrothermal stability, one conventional approach has been to back-exchange a substantial proportion of polyvalent metal ions into the ammonium zeolite prior to calcining, exemplary polyvalent metals being magnesium, calcium, rare earth metals, etc. I have found however that the introduction of such polyvalent metal cations substantially reduces the activity of such catalysts when utilized at the low pressures required herein.

To achieve the herein desired low pressure activity as well as hydrothermal stability, the calcination step referred to above is carried out at temperatures of about 950°–1,800°F, preferably about 1100°–1,650°F, and preferably in the presence of at least 0.2 psi of water vapor, still more preferably, about 5 to 15 psi. It is not essential that steam be present during the entire calcination; it is entirely feasible to carry out a dry calcination to effect deammoniation, and thereafter carry out the steam calcination. Any suitable procedure may be utilized for maintaining the desired water vapor partial pressure in contact with the zeolite during at least an effective portion of the calcination treatment. In one modification, the wet zeolite from the exchange step can merely be heated in a covered container so as to retain the water vapor generated therefrom. Alternatively, the zeolite can be introduced into a batch or continuous rotary furnace, or a static bed calcination zone, into which preheated steam or humidified air is introduced. The duration of the calcination treatment is at least about 0.5 minutes, preferably about 30 minutes to about 4 hours. Suitable steam treatments are described more in detail in U.S. Pat. No. 3,354,077. When steam is utilized, it is not necessarily present during the entire calcining period.

One effect of the hydrothermal stabilization calcination is a reduction in the unit cell size of the zeolite. This parameter can be used as a measure of the required calcination severity for the present purposes. The factors time, temperature and water vapor partial pressure should be correlated so as to effect at least about 0.2 percent, and preferably at least about 0.4 percent, reduction in unit cell size from the cell size of the original sodium Y zeolite. High temperatures and high steam pressures tend to accelerate stabilization and unit cell shrinkage. In the conventional prior art calcinations noted above, the time-temperature factors are in general of insufficient severity to bring about detectable unit cell shrinkage.

If desired, the stabilized zeolite produced as above described can be subjected to a second ammonium ion exchange step to further reduce the sodium content thereof, and the resulting product then again calcined, preferably under dry conditions, to effect deammoniation thereof. The second calcination is conducted at temperatures between about 750° and 1,300°F, preferably about 800°–1000°F. The product resulting from such a double-exchange, double-calcination procedure is not only hydrothermally stable, but is stable in the presence of ammonia and water vapor.

A herein preferred modification of the stabilized zeolite described above is prepared by carrying out the final calcination after mixing the zeolite with a finely divided, hydrous metal oxide such as alumina, as described more particularly in my copending application Ser. No. 191,123, filed Oct. 11, 1971. The resulting composition is also hydrothermally stable and stable in the presence of ammonia and water vapor. This preferred zeolite is prepared as follows:

The initial sodium Y zeolite starting material, containing about 10–14 weight-percent of sodium as $Na_2O$, is first digested in conventional manner with an aqueous solution of a suitable ammonium salt such as the chloride, nitrate, sulfate, carbonate, acetate, etc. to replace at least about 20 percent but not more than about 95 percent, of the original sodium ions with ammonium ions. The sodium content should be reduced to about 0.6–5 percent, preferably about 1–4 percent by weight, as $Na_2O$. To reduce the sodium level to this value, it may be desirable to employ two or more stages of exchange treatments. If it is desired to remove less than about 50 percent of the sodium in this step, dilute acids, e.g., 0.01N $HNO_3$, may be used instead of ammonium salts. The initial steam calcination is then carried out as described above.

The resultant steam-calcined zeolite is then reexchanged with ammonium salt solution under sufficiently severe conditions to reduce the sodium content to less than about 3 weight-percent, usually less than 1 percent, and preferably less than about 0.6 weight-percent, as $Na_2O$. It should be realized that this second exchange treatment does not introduce any appreciable amount of ammonium ions into the exchange sites which were converted to hydrogen ion and/or decationized sites in the first calcination step; nearly all of the ammonium ions which go into the zeolite at this point do so by replacing remaining sodium ions. Since a substantial ammonium zeolite moiety is desired in the final calcination step for conversion to active exchange sites during the final calcination, it will be apparent that sufficient sodium should be initially present at the second exchange step to permit a substantial portion of the ion exchange capacity to become satisfied by ammonium ions. Accordingly, the zeolite subjected to the second ion exchange step should contain sufficient sodium remaining from the first exchange step to provide in the double-exchanged zeolite an amount of ammonium ion corresponding to at least about 5 relative percent, preferably 10-20 percent, of the original ion exchange capacity of the zeolite.

Prior to the final calcination step, preferably following the second exchange step, the zeolite component is intimately admixed with a finely divided, hydrous, refractory oxide of a difficulty reducible metal. The term "hydrous" is used to designate oxides having structural surface hydroxyl groups detectable by infra red analysis. The preferred oxides are alumina, silica, magnesia, beryllia, zirconia, titania, thoria, chromia, and combinations thereof such as silica-alumina, silica-magnesia, and the like. Naturally occurring clays comprising silica and alumina may also be utilized, preferably after acid treatment. The resulting mixtures may contain between about 0.5 and 98 weight-percent of the zeolite, preferably at least about 2 weight-percent, and generally about 5 to about 80 weight-percent, based on the combined dry weight of the zeolite and the metal oxide. The metal oxide can be combined with the zeolite as a hydrous sol or gel, as an anhydrous activated gel, a spray dried powder or a calcined powder. In one modification a sol or solution of the metal oxide precursor such as an alkali metal silicate or aluminate can be precipitated to form a gel in the presence of the zeolite.

When less hydrous forms of the metal oxide are combined with the zeolite, essentially any method of effecting intimate admixture of the components may be utilized. One such method is mechanical admixture, e.g., mulling, which involves admixing the zeolite in the form of a powder with the slightly hydrous, finely divided form of the metal oxide. Minor amounts of water, with or without an acidic peptizing agent such as a strong mineral acid, are usually added to facilitate admixture.

After admixing the hydrous oxide with the zeolite component, it is normally preferable at this point to form the mixture into the shape desired for the final catalyst. Conventional tableting, prilling, or extruding procedures may be utilized to produce tablets, prills or extrudate pellets having a diameter of about one-thirty-second inch to three-eighths inch. Other conventional pelleting aids may be added such as lubricants, binders, diluents, etc.

The pelleted zeolite-metal oxide composition is then subjected to a second calcining at temperatures between about 750° and 1,300° and F, preferably about 800°-1,000°F. It is preferred to maintain a relatively anhydrous environment during this second calcination. If there is a substantial water vapor partial pressure during this step, the final catalyst is usually less active than those produced in the substantial absence of water vapor. Accordingly, this calcination is preferably conducted in the presence of less than 2, and preferably less than about 1, psi of water vapor. The calcination may be regarded as complete when substantially all water and ammonia have been expelled from the catalyst, which, depending on the temperature employed, may range between about 10 minutes and 12 hours or more.

In the foregoing description of double-exchanged, double-calcined zeolites, a common characteristic resides in utilizing relatively high temperatures for the first calcination and relatively low temperatures for the second. This is the preferred sequence for obtaining zeolites which are both hydrothermally stable and ammonia stable. However, the calcinations can be reversed with the low temperature calcination being performed first and the high temperature second. This procedure is described in more detail in U.S. Pat. No. 3,293,192, the product thereof being termed Zeolite Z-14US (ultrastable). This material, though not stable in hydrous ammonia environments, can be successfully utilized in environments free of one or both of ammonia and water vapor.

The necessary metal hydrogenation component may be distributed selectively on the zeolite component of the catalyst, or on the amorphous oxide component. Alternatively it may be distributed more or less equally on both components. Effective hydrogenation components comprise the Group VIB and/or Group VIII metals and their oxides and/or sulfides, with or without other metals such as rhenium. Operative proportions (based on free metal) may range between about 0.1 percent and 30 percent by weight, depending upon the type of metal or metals selected, and the desired activity. In the case of the Group VIII noble metals, amounts in the range of 0.1 to about 2 percent will normally be employed; the iron group metals, iron, cobalt and nickel, are normally utilized in proportions of about 1-10 weight-percent; the Group VIB metals will normally be utilized in proportions of about 3-20 weight percent. Preferred hydrogenating metals are palladium, platinum, nickel, cobalt, tungsten and molybdenum. Particularly preferred are palladium, or combinations of nickel and/or cobalt with molybdenum and/or tungsten.

The hydrogenating component may be added to the catalyst at any desired stage in its manufacture. Preferred methods include impregnation and/or ion-exchange of soluble metal salts into the powdered zeolite after the second ammonium ion exchange, or into the catalyst pellets prior to the final calcination step. Other methods include mixing of soluble or insoluble compounds of the desired metal or metals with the powdered zeolite-hydrous metal oxide mixture prior to extruding or pelleting.

B. Process Description

In broad aspect the invention simply involves passing the desired feedstock along with added hydrogen through a hydrocracking reactor containing a stabilized Y zeolite catalyst as above described, cooling and condensing the resulting product to recover recycle gas, fractionating the liquid product to recover the desired gasoline-boiling-range product, and recycling the desired fraction of unconverted oil. Operative hydrocracking conditions are as follows:

| Hydrocracking Conditions | Broad Range | Preferred Range |
|---|---|---|
| Temperature, °F | 450 – 850 | 500 – 750 |
| $H_2$ Partial Pressure, psi | 300 – 1000 | 400 – 800 |
| LHSV | 0.5 – 10 | 1.0 – 5 |
| $H_2$/Oil Ratio, MSCF/B | 2 – 15 | 4 – 10 |

At any given space velocity within the above ranges, an appropriate temperature is selected to give a desired conversion per pass, falling within a conversion range which in turn is dependent upon the hydrogen, partial pressure. This relationship between hydrogen pressure and conversion per pass is depicted in the drawing, in which the solid-line polygon is intended to enclose roughly the pressure-conversion combinations which spell out the more economically feasible operations. It will be understood that economic feasibility in the present context is based upon a correlation of three principal factors: operating pressure, conversion per pass, and catalyst deactivation rates. At very low pressures, the savings in plant construction and operating costs may render conversions of as low as 15 volume-percent economically feasible, particularly since at such low severity operations, catalyst life will be greatly extended. At the higher pressures depicted in the graph, economic feasibility generally requires maintaining higher conversions per pass. Hence the slope of the line $10C = P-300$.

The area to the right of the line $10c = P-150$ is even more economically desirable, although catalyst deactivation rates tend to increase somewhat going from left to right in the polygon. This deactivation rate is however seldom a controlling factor in the area above the line $10C = P+300$, but below that line may become controlling in the case of refractory, high end point feedstocks, or feedstocks containing sulfur and nitrogen compounds. For all these reasons, it is hence preferred to operate in the area between the lines $10C = P-150$ and $10C = P+300$.

Catalyst deactivation rates are measured herein in terms of the average daily temperature increase required to maintain the preselected conversion per pass. This temperature increase requirement (TIR) will be high at the beginning of a run with a fresh catalyst, but generally levels out within about 20–30 days to a value of less than about 2°, and normally less than 1°F per day. Thus, run lengths of at least about 4 months, and normally 6 months to about 2 years are obtainable.

FEEDSTOCKS

The hydrocracking feedstocks which may be treated herein include in general any mineral oil fraction boiling above the boiling range of the desired gasoline product, and containing less than about 10 ppm of organic nitrogen. Included primarily are fractions boiling above about 350°F and usually above about 400°F, and having an end-boiling point of up to about 1,000°F. This includes straight run gas oils and heavy napthas, coker distillate gas oils, deasphalted crude oils, cycle oils derived from catalytic or thermal cracking operations, and the like. Such fractions may be derived from petroleum crude oils, shale oils, tar sand oils, coal hydrogenation products and the like. Specifically it is preferred to employ feedstocks boiling between about 400° and 900°F, having an API gravity of about 20° to 40°, containing less than about 5 ppm of organic nitrogen. Feedstocks richer in nitrogen are preferably subjected to a prehydrofining operation.

Although organic nitrogen compounds, and to some extent organic sulfur compounds, cannot be tolerated in significant amounts in the hydrocracking zone, it is noteworthy that the zeolite catalysts of this invention are much more tolerant to ammonia and hydrogen sulfide which may be generated in conventional prehydrofining operations. This tolerance is found to extend also to the low pressure operations described herein, and hence an "integral" operation is feasible, with total effluent from the hydrofiner passing into the hydrocracker without intervening condensation or separation of $NH_3$ and $H_2S$. The presence of ammonia, and to a lesser extent $H_2S$, requires the use of higher hydrocracking temperatures to maintain the desired conversion, but the significant factor is that these temperatures are essentially stable after, e.g., 20–30 days operation, the TIR being less than about 1°F per day, and normally less than about 0.5° per day.

The following examples are cited to illustrate the invention, but are not to be construed as limiting in scope:

EXAMPLES 1–4

Preparation of Catalysts

Catalyst A:

Sodium Y zeolite was ion exchanged with ammonium sulfate solution until the sodium content was reduced to 1.5–2 weight-percent $Na_2O$. The resulting ammonium-sodium zeolite was then calcined in flowing steam for one hour at 1,292°F and then further ion exchanged with ammonium salt solution until the sodium content was reduced to less than 0.2 percent $Na_2O$. The resulting product was then slurried in dilute ammonium hydroxide, into which a solution of palladium chloride in dilute ammonium hydroxide was slowly stirred. The product was washed free of chloride, mixed with 20 weight-percent (dry basis) of acid-peptized alumina, extruded into ⅛ inch pellets, dried and calcined at about 900°F for one hour. The finished catalyst contained about 0.5 weight-percent Pd, and the unit cell size of the zeolite was 24.483 A.

Catalyst B:

A sample of Davison ultrastable zeolite Z-14US was composited with 0.5 weight-percent Pd and 20 percent $Al_2O_3$ as described above to give a product with a unit cell size of 24.337 A. The Z-14US zeolite was prepared by a double-exchange, double-calcination procedure described in U.S. Pat. No. 2,293,192, i.e., with the low temperature calcination first and the high temperature last.

Catalyst C:

Sodium Y zeolite was ammonium ion exchanged, steam calcined and again ammonium ion exchanged as described in the catalyst "A" procedure. The resulting product was then dried and mulled with acid-peptized alumina gel, nickel carbonate, ammonium heptamolybdate and sufficient concentrated nickel nitrate solution to provide a moist, extrudable paste. The proportions of ingredients were such as to provide a finished catalyst of about the following weight-percent composition:

| | |
|---|---|
| Zeolite | 60 |
| $Al_2O_3$ gel | 20 |
| $MoO_3$ | 15 |
| NiO | 5 |

The mulled mixture was then extruded into 1/16 inch pellets, dried and calcined at 900°F for one hour.

Catalyst D was a more conventional Pd-Y zeolite catalyst comprising a copelleted composite of 20 weight-percent alumina, 80 weight-percent of a magnesium back-exchanged hydrogen Y zeolite (3 weight-percent MgO), and 0.5 weight-percent of Pd. This catalyst had not been subjected to hydrothermal stabilization, but was hydrothermally stable by virtue of its zeolitic magnesium content.

EXAMPLES 5–8

Catalysts A, B, C and D above were ground to 14–20 mesh particles and compared for hydrocracking activity, using as feed an unconverted gas oil derived from a previous hydrofining-hydrocracking run, having an API gravity of 38°, and a boiling range of 360°–870°F, with about 12 percent boiling below 400°F. For test purposes, the feed was doped with 0.5 weight-percent S as thiophene and 0.2 weight-percent N as tertbutylamine. Each catalyst was tested at hydrogen pressures of about 1,450 and 500 psi, each run being carried out at LHSV 1.7, $H_2$/oil ratio of 8,000 SCF/B, temperatures being periodically adjusted to maintain a total liquid product gravity of 47°API. By previously established correlations, this product gravity corresponds to a conversion of about 38 volume-percent to $C_4$–400°F gasoline (after deducting the 12 volume-percent of feed which boiled below 400°F). The respective temperatures required to maintain this conversion after 100 hours on stream were as follows:

Table 1

| Catalyst | Temperatures for 38% Conversion, °F | |
|---|---|---|
| | 1450 psi | 500 psi |
| A | 689 | 736 |
| B | 712 | 742 |
| C | 707 | 724 |
| D | 722 | 840+[1] |

[1]Catalyst was deactivating so rapidly that only about 23 percent conversion was being obtained. TIR was about 22°F per day with no apparent leveling out.

It will be seen that all four catalysts had good activity at 1,450 psi, but that the magnesium-stabilized catalyst D was almost completely deactivated after 100 hours at 500 psi, while thermally stabilized catalysts A, B and C continued to show good activity. Catalyst C was particularly outstanding in that it was about 50 percent more active than its noble metal analog, catalyst A, at 500 psi, while being less active than catalyst A at 1,450 psi. Catalysts comprising nickel and/or cobalt plus molybdenum and/or tungsten as hydrogenating component are hence preferred for the low-pressure hydrocracking of feeds containing both sulfur and nitrogen. There is also a slight preference for this type of catalyst over noble metal catalysts when using nitrogen-free but sulfur-containing feeds, as the following examples will show:

EXAMPLES 9–10

Catalysts A and C were tested as described in Examples 5–8, using the same feed except for the omission of the added tert-butylamine. In this case however, temperatures were adjusted to maintain a product gravity of 49.5°API, which corresponds to a conversion of about 48 volume-percent to $C_4$–400°F gasoline. The results were as follows:

Table 2

| Catalyst | Temperatures for 48% Conversion, °F | |
|---|---|---|
| | 1450 psi | 500 psi |
| A | 510 | 679 |
| C | 562 | 676 |

It will be seen that at 1,450 psi, catalyst C was greatly inferior to noble metal catalyst A, but at 500 psi was somewhat superior. Moreover, near the end of the runs at 500 psi, the deactivation rate (TIR) for catalyst A was about 14.4°F per day, while for catalyst C it was only about 3.2°F per day. Previous correlations show that if the latter run were extended another 20 days, the deactivation rate for catalyst A would also level out after 20–30 days on stream to less than about 1°F per day, but at a higher temperature than for catalyst C.

EXAMPLE 11

Catalyst C was used to hydrocrack another hydrofined gas oil having an API gravity of 35° and a boiling range of 175°–716°F, with about 9 percent boiling below 400°F. The feed contained about 1 ppm nitrogen and 12 ppm sulfur.

The catalyst was presulfided with a $H_2/H_2S$ mixture and evaluated at 950 psig, and at 3.0 and 1.7 LHSV. $H_2$/oil ratio was 8,000 SCF/B. The temperature was periodically adjusted to maintain a total product gravity of 60.5°API, corresponding to a conversion of about 80 volume percent per pass to $C_4$–400°F gasoline (after deducting the 9 volume-percent of feed boiling below 400°F).

After 250 hours on stream at 3.0 LHSV, the temperature required to maintain conversion was about 660°F and the deactivation rate was about 2.5°F per day. After 300 hours on stream the deactivation rate was about 1.2°F per day. After a further 160 hours on stream at 1.7 LHSV the deactivation rate was less than 0.3°F per day, and the temperature required to maintain 80 percent conversion to 400°F-minus end point gasoline was 642°F.

From this data, it can be deduced that a commercial operation of greater than six months duration is feasible using the above conditions.

EXAMPLE 12

Operation as in Example 11 was continued at 700 psig. After a further 140 hours on stream, the required temperature for 80 percent conversion was 670°F, and the deactivation rate was less than 0.5°F per day.

The following claims and their obvious equivalents are intended to define the true scope of the invention:

1. A process for the hydrocracking of a mineral oil feedstock boiling above the gasoline range to produce hydrocarbons boiling in the gasoline range, which comprises contacting said feedstock plus added hydrogen with a catalyst comprising a Group VIII metal hydrogenating component supported on a metal-cation-deficient Y zeolite base containing less than about 1 weight-percent sodium as $Na_2O$, said Y zeolite base having been stabilized by calcining an ammonium form thereof for a time and at a temperature sufficient to reduce the unit cell size thereof by at least about 0.2 percent, said contacting being carried out at a space velocity above about 0.5 and at a temperature correlated with hydrogen pressure $(P)$, in psi, so as to give a volume-percent conversion per pass $(C)$ to $C_4$–400°F end point gasoline falling, as does $(P)$, within the polygon shown in the drawing and defined by the lines, $P = 300$, $P = 1000$, $C = 15$, $C = 90$, and $10C = P-300$.

2. A process as defined in claim 1 wherein $(C)$ and $(P)$ fall within the polygon defined by the lines, $P = 300$, $C = 85$, $10C = P-150$, and $10C = P+300$.

3. A process as defined in claim 1 wherein said hydrogenating component comprises palladium.

4. A process as defined in claim 1 wherein said hydrogenating component is selected from the class consisting of cobalt and nickel and the oxides and sulfides thereof.

5. A process as defined in claim 4 wherein said catalyst also comprises a hydrogenating component selected from the class consisting of molybdenum and tungsten, and the oxides and sulfides thereof.

6. A process as defined in claim 1 wherein said calcination is carried out at a temperature between about 950° and 1,800°F.

7. A process as defined in claim 6 wherein said calcination is carried out in the presence of at least about 0.2 psi of steam.

8. A process for the hydrocracking of a mineral oil feedstock boiling above the gasoling range to produce hydrocarbons boiling in the gasoline range, which comprises contacting said feedstock plus added hydrogen with a catalyst comprising a Group VIII metal hydrogenating component supported on a composite of (1) a refractory amorphous oxide of a difficulty reducible metal and (2) a thermally stabilized, metal-cation-deficient Y zeolite containing less than about 0.6 weight-percent sodium as $Na_2O$, said contacting being carried out at a space velocity above about 1.0 and at a temperature correlated with hydrogen pressure ($P$), in psi, so as to give a volume-percent conversion per pass ($C$) to $C_4$–400°F end point gasoline falling, as does ($P$), within the polygon shown in the drawing and defined by the lines, $P = 300$, $P = 1000$, $C = 15$, $C = 90$, and $10C = P-300$, said composite catalyst support having been prepared by:
1. calcining an ammonium Y zeolite containing about 1–4 weight-percent $Na_2O$ at a temperature between about 1,100° and 1,650°F in the presence of at least about 0.2 psi of water vapor for a sufficient time to reduce its unit cell size by at least about 0.2 percent;
2. subjecting the resulting product to further ammonium ion exchange to reduce the sodium content to below about 0.6 weight-percent $Na_2O$;
3. admixing the resulting product with a minor proportion of a hydrous, refractory amorphous oxide of a difficultly reducible metal, and shaping the resulting mixture into pellets of desired form and size; and
4. calcining the resulting pellets at temperatures between about 800° and 1,000°F.

9. A process as defined in claim 8 wherein ($C$) and ($P$) fall within the polygon defined by the lines, $P = 300$, $C = 85$, $10C = P-150$, and $10C = P+300$.

10. A process as defined in claim 8 wherein said hydrogenating component comprises palladium.

11. A process as defined in claim 8 wherein said hydrogenating component is selected from the class consisting of cobalt and nickel and the oxides and sulfides thereof.

12. A process as defined in claim 11 wherein said catalyst also comprises a hydrogenating component selected from the class consisting of molybdenum and tungsten, and the oxides and sulfides thereof.

13. A process as defined in claim 8 wherein said amorphous oxide is essentially alumina.

14. A process as defined in claim 13 wherein ($C$) and ($P$) fall within the polygon defined by the lines, $P = 300$, $C = 85$, $10C = P-150$, and $10C = P+300$.

15. A process as defined in claim 13 wherein said hydrogenating component comprises palladium.

16. A process as defined in claim 13 wherein said hydrogenating component is selected from the class consisting of cobalt and nickel and the oxides and sulfides thereof.

17. A process as defined in claim 16 wherein said catalyst also comprises a hydrogenating component selected from the class consisting of molybdenum and tungsten, and the oxides and sulfides thereof.

* * * * *